(12) United States Patent
Hansen

(10) Patent No.: US 6,234,782 B1
(45) Date of Patent: May 22, 2001

(54) INJECTION MOULD FOR MAKING A BUCKET WITH A PIVOTAL HANDLE

(75) Inventor: Albert B. C. Hansen, Dragør (DK)

(73) Assignee: A.B.C. Hansen Vaerktojsfabrik A/S, Dragor (DK)

( * ) Notice: Subject to any disclaimer, the term of this patent is extended or adjusted under 35 U.S.C. 154(b) by 0 days.

(21) Appl. No.: 09/308,497

(22) PCT Filed: Nov. 17, 1997

(86) PCT No.: PCT/DK97/00527

§ 371 Date: Jul. 14, 1999

§ 102(e) Date: Jul. 14, 1999

(87) PCT Pub. No.: WO98/22273

PCT Pub. Date: May 28, 1998

(30) Foreign Application Priority Data

Nov. 21, 1996 (DK) .................................... 1329/96

(51) Int. Cl.[7] .................................................. B29C 65/58
(52) U.S. Cl. .......................... 425/517; 29/434; 29/527.1; 249/58; 249/98; 264/238
(58) Field of Search ................................... 425/517, 572, 425/129.1, 577; 264/238; 29/434, 453, 527.1; 249/58, 64, 68, 98, 144, 162

(56) References Cited

U.S. PATENT DOCUMENTS

| | | | |
|---|---|---|---|
| 3,358,877 | * 12/1967 | Eckhoff | 220/775 |
| 3,631,584 | * 1/1972 | Walkup et al. | 29/434 |
| 3,861,840 | * 1/1975 | Heisler | 425/130 |
| 4,210,620 | 7/1980 | Von Holdt . | |
| 4,632,357 | 12/1986 | Von Holdt . | |
| 4,796,775 | * 1/1989 | Dudzik | 220/92 |
| 4,799,306 | * 1/1989 | Collins et al. | 29/453 |
| 4,896,415 | * 1/1990 | Bock | 29/453 |

FOREIGN PATENT DOCUMENTS

| | | |
|---|---|---|
| 3345216 | 6/1984 | (DE) . |
| WO9406694 | 3/1994 | (WO) . |

* cited by examiner

Primary Examiner—Harold Pyon
Assistant Examiner—Emmanuel Luk
(74) Attorney, Agent, or Firm—Pillsbury Winthrop LP

(57) ABSTRACT

An injection mould for making a bucket with a handle pivotally connected to the bucket by means of projections on the handle, said projections being in snap engagement with diametrally opposed openings in the bucket, said mould comprising a stationary mould half (20) and a movable mould half (21). The two mould halves (20,21) define a bucket mould cavity (27) corresponding to the shape of the bucket and handle mould cavity (29) corresponding to the shape of the handle and which in its entirety is radially external to the bucket mould cavity (27). The handle mould cavity (29) is externally defined by a movable mould member (34) in each of the portions corresponding to the projections. The mould member (34) is arranged on an arm (36) connected to an ejection plate (32). Further ejection pins (33) are connected to the ejection plate (32) for ejection of the handle. A driving means (44,46,47) is connected to the arm (36) and adapted to drive the mould member (34) with the handle (32) inwardly into engagement with the openings of the bucket when the ejection movement of the ejection plate (32) is completed.

8 Claims, 6 Drawing Sheets

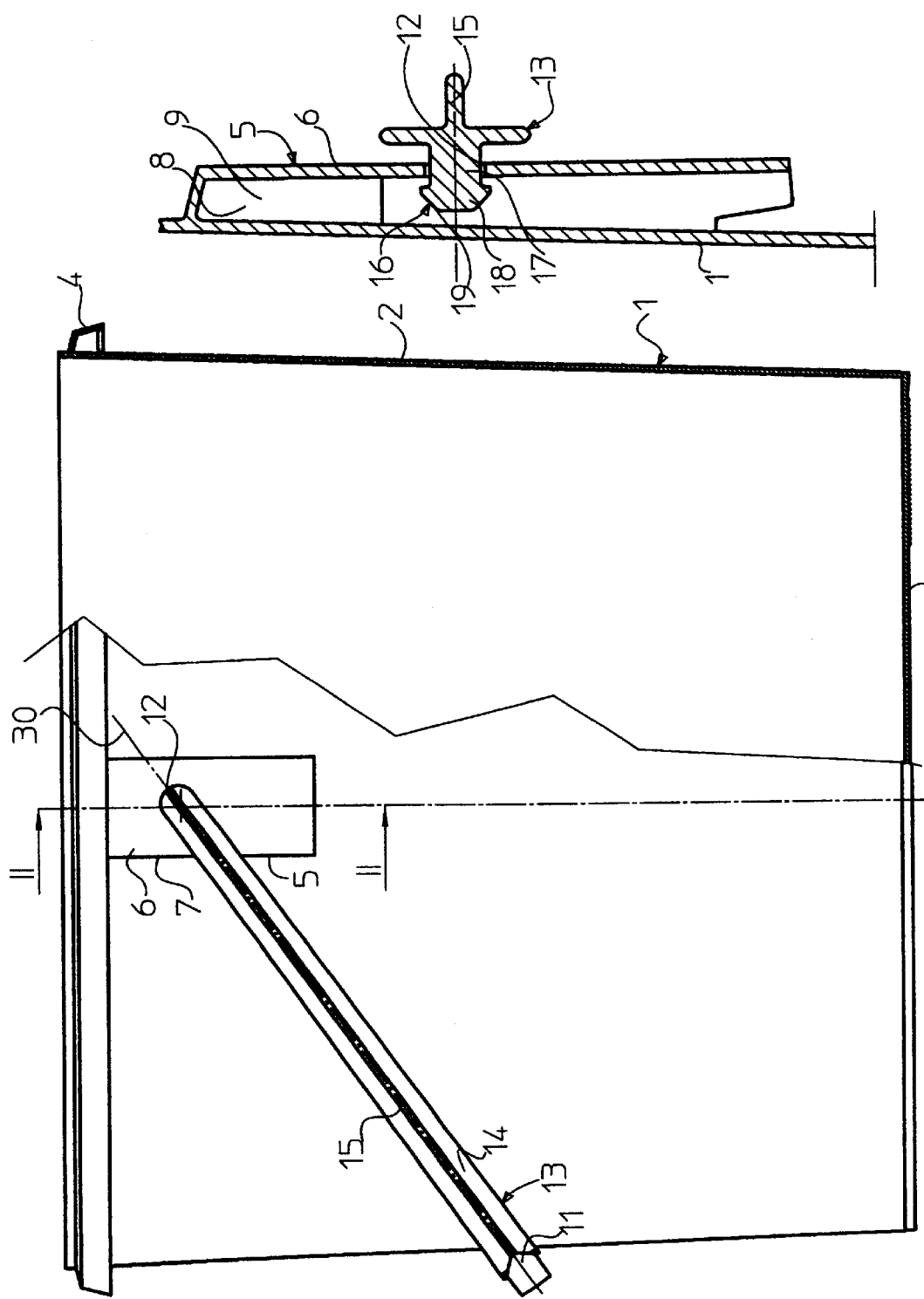

INJECTION MOULD FOR MAKING A BUCKET WITH A PIVOTAL HANDLE

This application is the national phase of international application PCT/DK97/00527 filed Nov. 17, 1997 which designated the U.S.

TECHNICAL FIELD

The invention relates to an injection mould for making a bucket with a handle being pivotally connected to the bucket at two diametrically opposed portions thereof, each end of the handle being provided with a radial projection facing inwards and having an enlarged head snap-engaging an opening in an ear formed on the exterior of the bucket in each of the said diametrically opposed portions, said injection mould comprising a stationary mould half and a movable mould half axially displaceable in relation to each other between a closed and an open position and defining a handle mould cavity corresponding to the shape of the handle and a bucket mould cavity corresponding to the shape of the bucket, the stationary mould half having a female mould part to form the outer surface of the bucket and the movable mould half having a male mould part to form inner surface of the bucket.

BACKGROUND ART

The most common method of manufacture of a plastic bucket with a handle is to mould the bucket and the handle in individual moulds and subsequently mounting the handle on the bucket by bringing the projections of the handle into snap engagement with the openings in the ears of the bucket.

Several attempts have been made to manufacture a plastic bucket with an associated handle in an one piece mould. The previously suggested moulds are, however, rather complicated and considerably larger than a conventional mould for the separate manufacture of a bucket. The use of a larger mould entails that a larger injection press is needed to manufacture the bucket resulting in increased manufacturing costs.

U.S. Pat. No. 4,632,357 discloses a mould for making a bucket with a handle, the bucket and handle being moulded with the projections of the handle engaging openings in the ear of the bucket. Furthermore U.S. Pat. No. 4,210,620 discloses a mould for making a pail with a bail, each opposing end of the bail provided with an opening interengaging corresponding projections on the exterior of the bucket. The projections and the ears are moulded in interengagement. Both of the moulds suggested in the two publications are fairly large and complicated.

BRIEF DESCRIPTION OF THE INVENTION the object of the invention is to provide an injection mould for making a bucket with a handle and whose design is more simple than known moulds and which is substantially not larger than a conventional mould used for making a separate bucket.

The injection mould according to the invention is characterised in that the handle mould cavity in its entirety is radially external to the bucket mould cavity, the mould portion forming the projections of the handle being in the same axial plane as the mould portions forming openings of the bucket, but axially displaced towards the movable mould half, and in that the movable mould half comprises an ejection plate having ejection pins extending to the handle mould cavity, and that in the portion corresponding to each of the projections the handle mould cavity being externally defined by a movable mould member arranged on an arm connected to the ejection plate, a driving means being attached to the arm and adapted to drive the mould member with the handle inwardly so as to bring the projections of the handle into engagement with the openings of the bucket ears when the ejection movement of the ejection plate is completed.

The handle and the bucket are thus moulded simultaneously in separate cavities. When opening the mould the handle and the bucket are both in the movable mould half. The handle is then ejected, while the bucket remains on the male mould part of the movable mould half. During the ejection of the handle the movable mould members are moved axially outwardly synchronously with the handle due to their connection with the ejection plate through the arms. Then the mould members and thus also the handle portions with the projections are driven substantially radially inwardly so as to bring the projections into engagement with the openings in the ears of the bucket. Finally the bucket with the handle mounted thereon is removed from the movable mould half. The injection mould according to the invention corresponds in many ways to a conventional mould for making a separate bucket, the present mould, however, further being provided with the handle mould cavity and the ejection plate with the associated ejection pins and with the movable mould members with the associated arms and driving means. This further entails that the present invention can be used for converting existing moulds used for making a separate bucket and that the present mould is not larger that a mould for making the separate bucket, for which reason larger machines are not required for making a bucket with a handle in a mould according to the present invention than hitherto have been used for making the bucket. Furthermore, due the fairly simple structure of the mould, the cycle time is substantially the same as the cycle time when making a separate bucket, whereby a saving in time is obtained in relation to the conventional method, in which the handle and the bucket are made in separate moulds and the handle subsequently is mounted on the bucket.

According to the invention the movable mould members may each have a mould cavity forming portion adapted to ensure a releasable attachment of the handle to the mould members when the said members are driven inwardly to bring the projections of the handle into engagement with the openings of the bucket ears. As a result the handle is securely retained when it is removed from the handle mould cavity and its projections subsequently are brought into engagement with the openings of the bucket ears. In this connection it should be noted that the force necessary to remove the mould cavity forming portions of the movable mould members from the handle of course is less than the force necessary for pulling the projections of the handle out of snap engagement with the openings of the bucket ears when these interengage said openings.

Furthermore according to the invention the mould cavity forming comprises a recess provided in the movable mould member and forming a portion of a rib externally on the handle. Since conventional handles often are provided with an outer rib to increase the rigidity of the handle, this embodiment presents no substantial change in the appearance of a conventional handle.

Moreover according to the invention the mould member may be fixedly secured to the arm which in turn is connected to the ejection plate such that at least the portion of the arm on which the mould member is arranged may be driven inwardly.

In this connection, according to yet another embodiment of the invention the arm may be pivotally connected to the ejection plate. This embodiment of the invention is currently considered to be the most advantageous embodiment.

Furthermore according to the invention the driving means may comprise a slide arranged radially displaceably in the movable mould half, said slide having an opening through which the arm extends, and said opening being provided with guide surfaces radially on each side of the arm so as to ensure that the movable mould member is displaced substantially axis parallel to the guide pins during the ejection movement of the ejection plate.

Finally according to the invention the movable mould member or the arm on which this is arranged and the stationary mould half may have abutment faces co-acting in radial direction and abutting each other in the closed position of the mould so as to prevent the injection pressure, to which the movable mould member is subjected, from being transferred to the driving means.

BRIEF DESCRIPTION OF THE DRAWINGS

The invention is explained in detail below with reference to the drawings, in which FIG. 1 is a side view of a bucket with a pivotally connected handle, partly in section, FIG. 2 is a sectional view along the line II—II in FIG. 1.

BEST MODE FOR CARRYING OUT THE INVENTION

Figure 3:
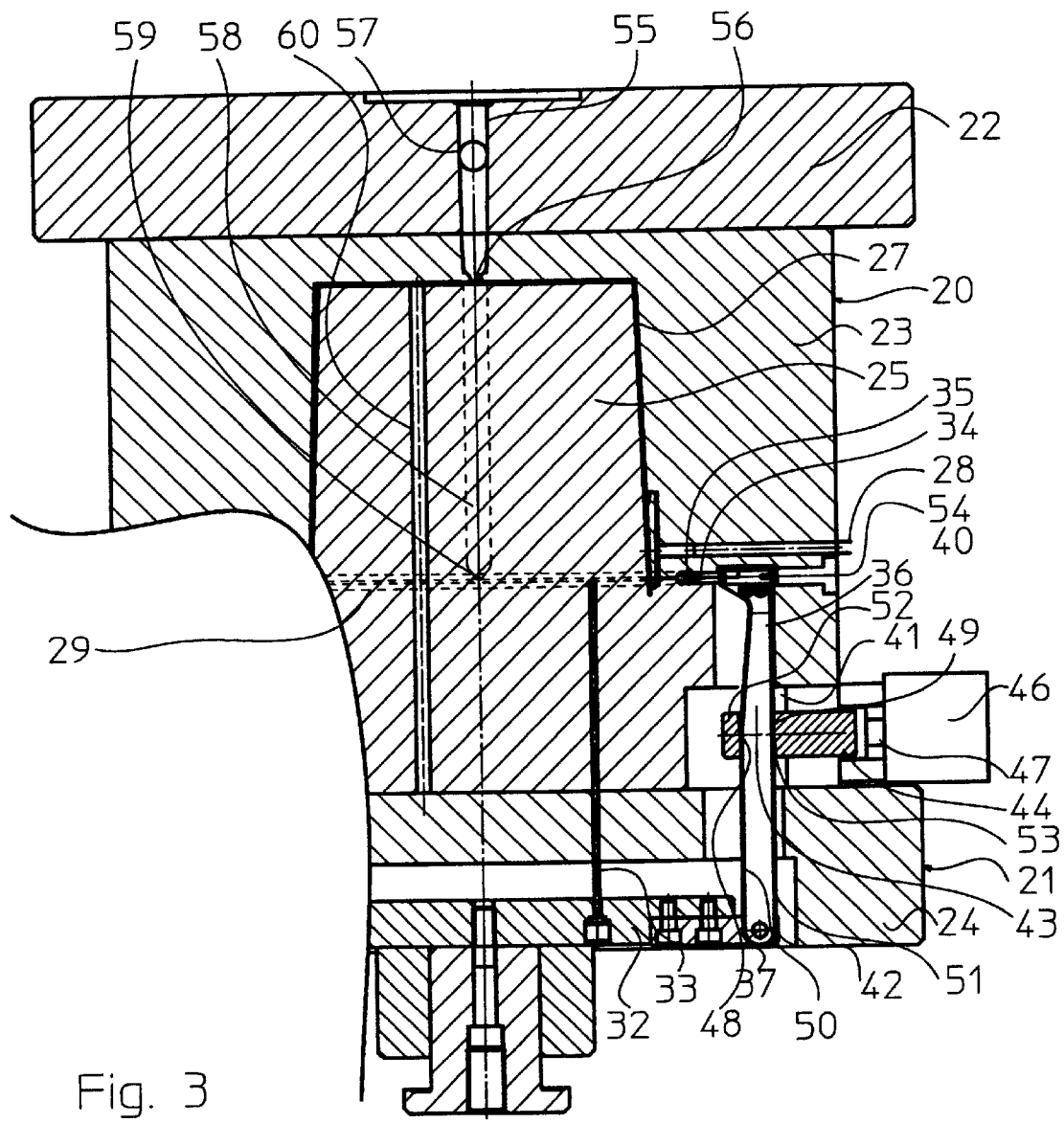
FIG. 3 is diagrammatic, vertical, partial and sectional view through an injection mould according to the invention for making the bucket with a handle shown in FIGS. 1 and 2 and which comprises a stationary mould half and a movable mould half.
Figure 4:
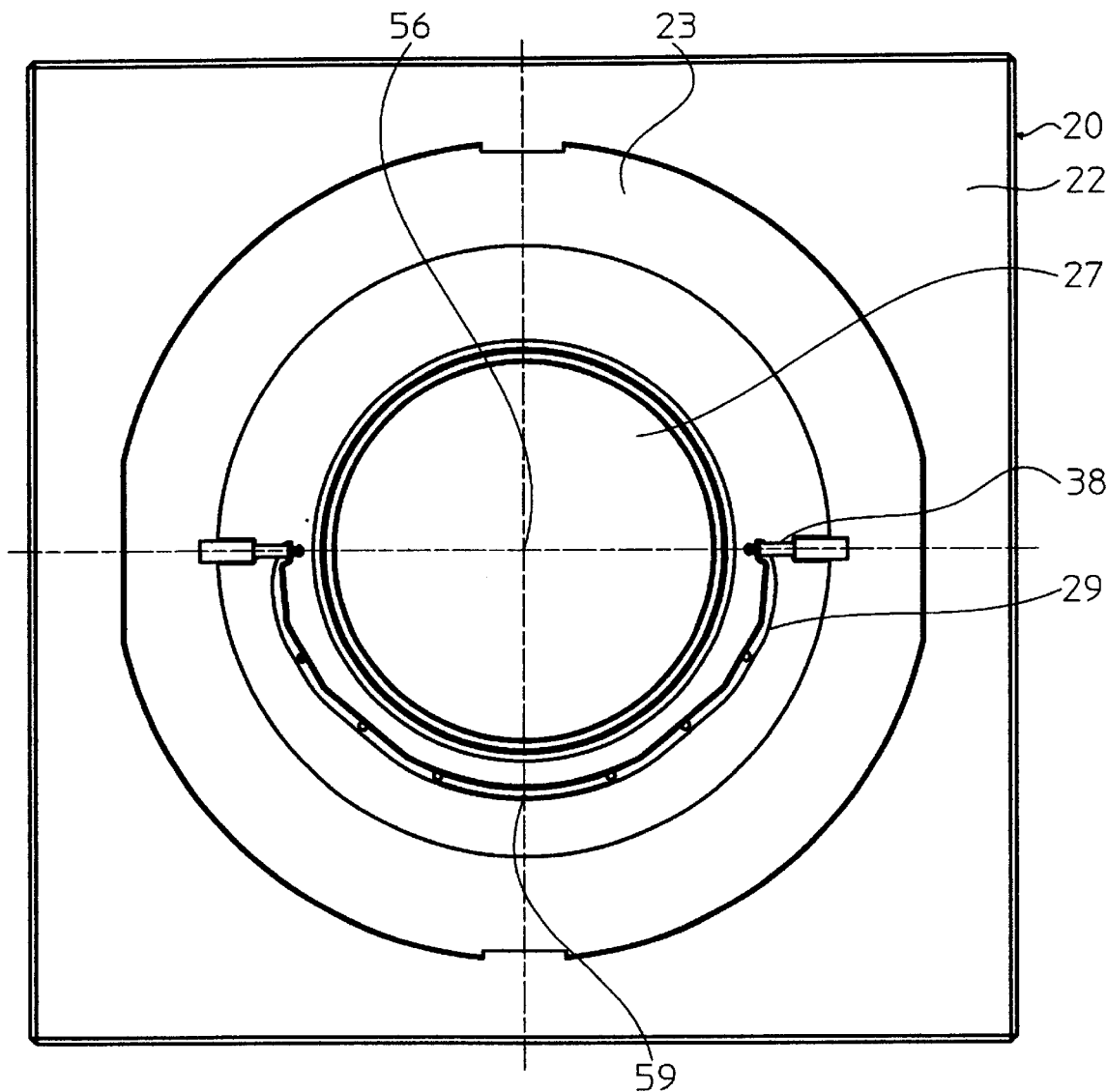
FIG. 4 is a diagrammatic view of the stationary mould half when seen axially towards its mould cavity.

The bucket with a handle shown in FIGS. 1 and 2 comprises a bucket 1 having a cylindrical, circumferential wall 2 downwardly ending in a bottom 3 and upwardly having an open, rib-like rim portion 4. At two diametrically opposed portions the bucket 1 is externally provided with an ear 5 comprising a front wall 6 extending downwards from the rim portion 4 and spaced apart from the wall 2 of the bucket and two side walls 7,8 connecting the front wall 6 with the wall 2 of the bucket. The front wall 6 and the side walls 7,8 thus define jointly with the wall 2 of the bucket 1 a downwardly open cavity 9. An annular opening 12 is provided in the front wall 6.

When seen in cross-section the handle 13 has substantially T-shape with a ribbon-shaped body 14 and an outwardly extending rib 15. Furthermore at each end the handle 13 is provided with a projection 16 extending inwards and having a shank 17 which at its outer end is provided with an enlarged head 18 having a tapering, outer surface 19. The projection 16 is adapted to snap engage the opening 12 in the ear 5, the head 18 thereof being inserted through said opening by the snapping action, whereby the shank 17 and the opening 12 form a pivotal connection between the handle 13 and the bucket 1. In said engagement position the projection 16 of the handle 13 cannot be made to disengage the opening 12—at least not without the use of violence. In the area at the gripping portion of the ribbon-shaped handle 13, the handle is substantially H-shaped when seen in cross-section, the rib 15 being connected with a short, ribbon-shaped part 11 extending substantially parallel to the ribbon-shaped body 14.

Figure 5:
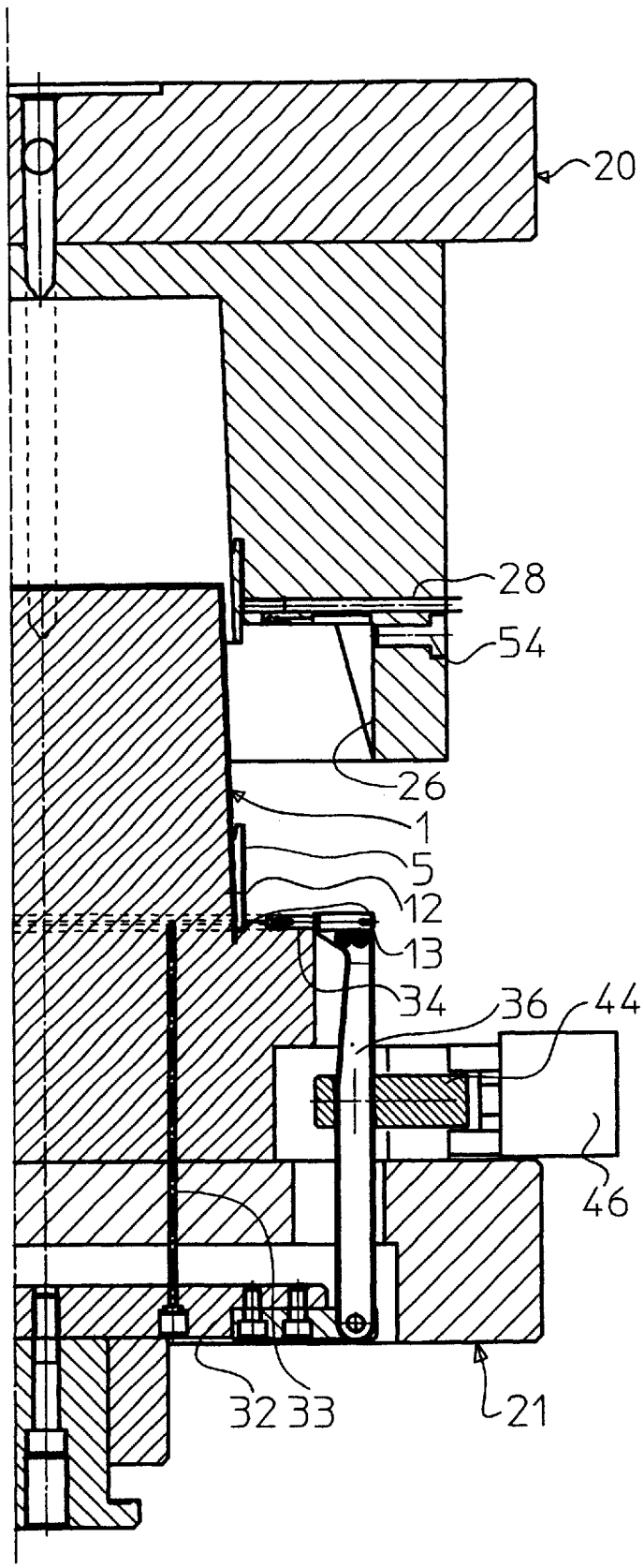
FIG. 5 is a diagrammatic view of the mould shown in FIG. 3 shown in its open position.
Figure 6:
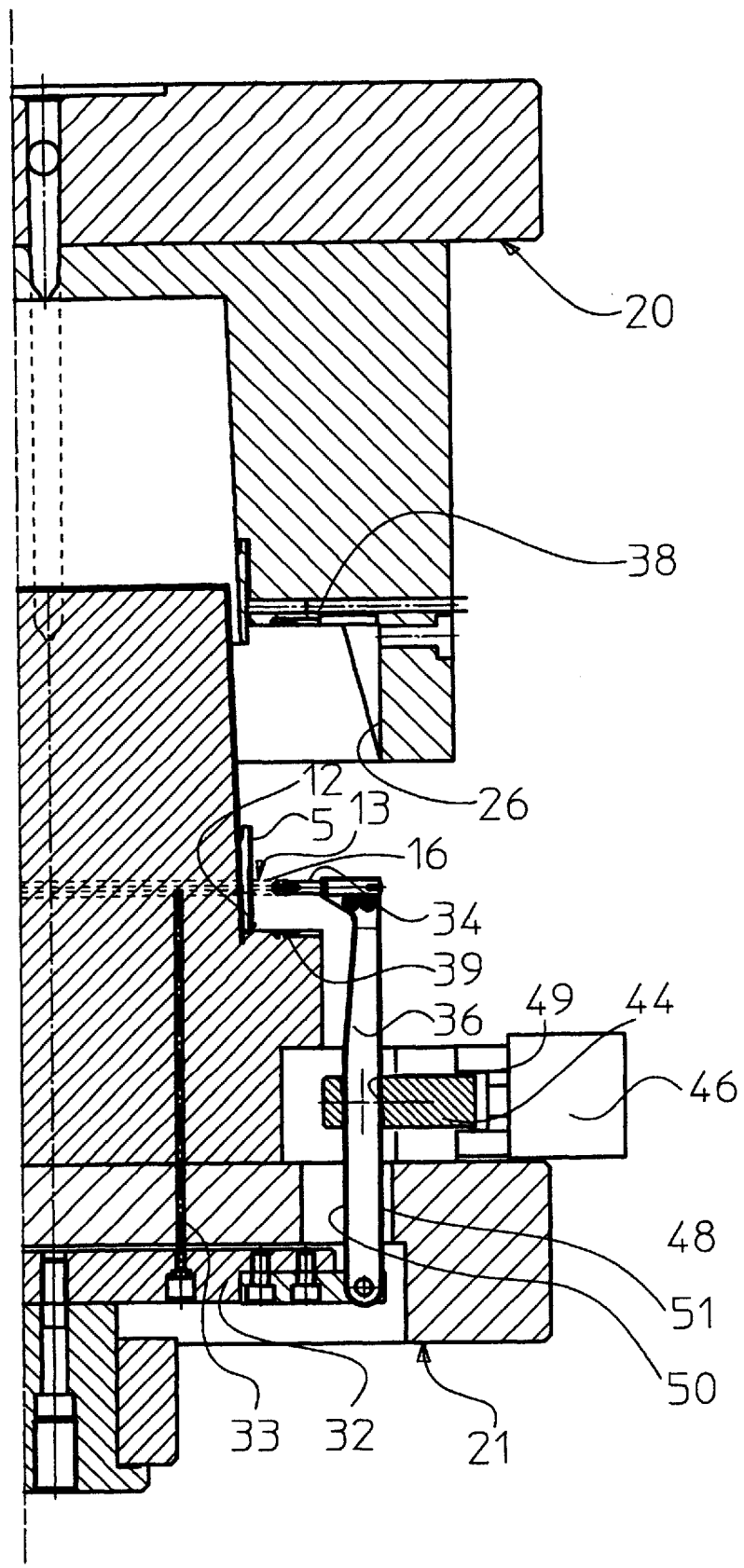
FIG. 6 illustrates the mould in FIG. 5 after ejection of the handle.
Figure 7:
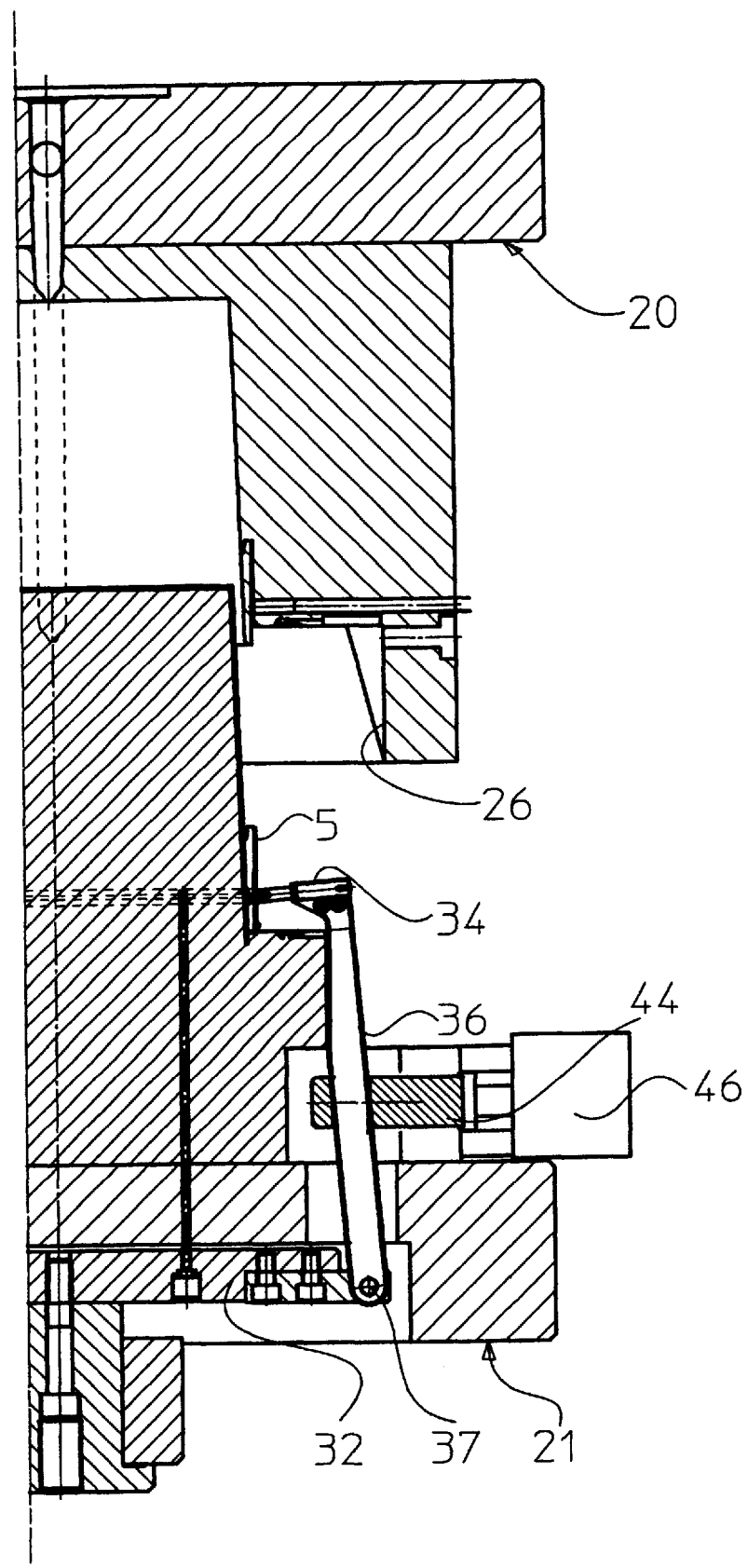
FIG. 7 illustrates the mould shown in FIG. 6 after mounting of handle on the bucket.

The injection mould shown in FIGS. 3 to 7 for making the bucket 1 with a handle 13 shown in FIGS. 1 and 2 comprises a stationary mould half 20 and a movable mould half 21. The stationary mould half 20 is provided with a mounting plate 22 and a female mould part 23 fixedly connected to the mounting plate 22. The movable mould half 21 is provided with a mounting plate 24 and a male mould part 25 being fixedly connected thereto. The movable mould half 21 and the stationary mould half 20 both have conical guide faces co-acting in the closed position of the mould to ensure a correct position of the two mould halves in relation to each other. The guide face 26 on the stationary mould half 20 is shown in FIGS. 5–7.

In the closed position of the mould shown in FIG. 3 the two mould halves 20,21 define a bucket mould cavity 27 of a shape corresponding to the shape of the bucket 1, the female mould part 23 substantially forming the outer surface of the bucket, its circumferential rim portion 4 and the diametrally opposed ears 5, while the male mould part 25 substantially forms the inner surface of the bucket. The openings 12 in the ears 5 are formed by means of cores arranged radially displaceably in the female mould part, only one core 28 being shown in the drawing. The cores 28 can be moved between the moulding position shown in FIG. 3 and the retracted position shown in FIGS. 5 to 7 by means of means (not shown).

The stationary and the movable mould halves 20,21 moreover define a handle mould cavity 29 having a shape corresponding to the shape of the handle 13. When seen relative to the symmetry plane 30 of the handle, half of the handle mould cavity 29 is in the stationary mould half 20 and the other half in the movable mould half 21, confer FIG. 1. As clearly shown in FIG. 4, which, however, only illustrates the stationary mould half 20, the handle mould cavity 29 is arranged such that it in its entirety is radially external to the bucket mould cavity 27, and the portions of the handle mould cavity 29 forming the projections 16 of the handle 13 are in the same axial plane as the cores 28 forming the openings 12 in the bucket for receiving the handle projections 16. As illustrated in FIG. 3 the portions of the handle mould cavity 29 forming the projections 16 are, however, axially staggered toward the movable mould half 21 in relation to the cores 28.

The movable mould half 21 is further provided with an ejection plate 32 being guided by means of means (not shown) for an axial movement in relation to the male mould part 25 and the mounting plate 24. The ejection pins 33, of which only one is shown in the drawing, are connected to the ejection plate 32 and extend in a known manner through the mounting plate 24 and the male mould part to the handle mould cavity, the inner end faces of said pins being flush the portion of the handle mould cavity forming the rib 15 of the handle 13.

The outwardly facing outer portions of the handle 13 aligned with the projections 16 are each formed of a movable mould member 34 in form of a pin with an inner end face 35 shaped so as to form said portions of the handle, i.e a portion of the rib 15 and the adjacent portions of the body 14, and thus form part of the handle mould cavity 29. In the portions adjacent the handle mould cavity 29 both the stationary mould half 20 and the movable mould half 21 is provided with recesses 38,39 corresponding to the outer outline of the pins 34 such that a tight closure of the mould cavity is obtained in the closed position of the mould.

The pin 34 is connected to an upper end of an arm 36. The arm 36 extends through a passage 40 formed of recesses in the female mould part 23 and the male mould part 25 in the closed position of the mould and further through a first cavity 41 in the male mould part 25 and a second cavity 42 in the mounting plate 24 of the movable mould half 21 to the ejection plate 32 with which it is pivotally connected about an axis 37. The arm 36 further extends through an opening 43 in the rod-like slide 44 which extends into the cavity 41 in the male mould part 25 through a radial guide opening. At its outer end the rod-like slide 44 is connected with the piston rod 47 of a pneumatic cylinder 46, said piston rod displacing the slide axially and thus pivots the arm 36 about its axis of rotation 37. The opening 43 of the slide 44 is provided with opposed slide faces 48,49 which are axially staggered in the longitudinal direction of the arm and abutting the adjacent side faces 50,51 of the arm 36 in the position of the slide 44 and thus the arm 36 shown in FIG. 3, said position corresponding to the moulding position of the mould in which said side faces 50,51 extend parallel to the ejection pins 33. Adjacent the slide faces 48,49 the opening 43 of the slide 44 is provided with surfaces 5,53 extending outwardly inclined to allow rotation of the arm when the slide 44 is displaced in inward direction in relation to the position shown in FIG. 3.

In order to prevent the injection pressure from being transferred to the slide 44 and thus to the pneumatic cylinder 46 during moulding the outer end face of the movable mould member 34 bears on an adjusting screw 54 in the female mould part 23 in the closed position of the mould shown in FIG. 3.

At the use of the injection mould according to the invention a mould cycle involves the following steps:

In the closed position shown in FIG. 3 molten plastics is injected into a main gate passage 55 in the stationary mould half 20 from which it flows into the bucket mould cavity 27 through a pin-point gate 56 arranged corresponding to the centre of the bottom of the bucket. In order to supply liquid plastics to the handle mould cavity 29 a radial gate passage 57 is branched off from the main gate passage 55, an inclined gate passage 58 extending therefrom to the handle mould cavity 29 and communicating therewith through a pin-point gate 59. The pin-point gate 59 is arranged corresponding to the rim of ribbon-shaped portion 11 of the handle, confer FIG. 4.

When the injected plastics has set, the mould is opened by pulling the movable mould half 21 away from the stationary mould half 20 as shown in FIG. 5. As a result the moulded bucket 1 and the handle 13 remain in the movable mould half 21.

The ejection plate 32 is then moved forward to eject the handle 13 by means of the ejection pins 33. During the ejection movement the arms 36 are displaced outwardly axis parallel to the guide pins 33. Hereby the movable mould members 34 remain in engagement with the handle 13, the inner end faces 35 of the members 34 forming part of the rib of handle 13, confer FIG. 6. The axis parallel movement of the arms 36 is ensured by the slide 44 being in a position in which its slide faces 48,49 extend parallel to the adjacent side faces 50,51 of the aims 36, confer the position shown in FIGS. 3, 5 and 6.

When the ejection plate 32 has reached the ejection position in FIG. 6, the slide 44 is displaced by means of the pneumatic cylinder 46 to the position shown in FIG. 7, whereby the arm 36 is pivoted inwardly about its axis of rotation 37 such that the projections 16 on the handle 13 which still engage the movable mould members 34 are made to snap engage the openings 12 in the ear 5 of the bucket 5. As a result the handle 13 is mounted on the bucket 1.

The slide 44 is now displaced outwardly, whereby the arm 36 returns to axis parallel position shown in FIG. 6 and the movable mould members 34 are made to disengage the handle.

The bucket and the handle mounted thereon are then removed from the movable mould half 21 by supplying compressed air to a number of passages 60, of which one is shown in FIG. 3, ending at the bottom 3 of the bucket 1.

Finally, the ejection plate 32 is moved back to its initial position shown in FIG. 5 and the movable mould half 21 is subsequently thereto moved forward for closure of the mould which is then ready for a new moulding cycle.

What is claimed is:

1. An injection mould for making a bucket with a handle being pivotally connected to the bucket at two diametrically opposed portions thereof, each end of the handle being provided with a radial projection facing inwards and having an enlarged head snap-engaging an opening in an ear formed on the exterior of the bucket in each of the said diametrically opposed portions, said injection mould comprising a stationary mould half and a movable mould half axially displaceable in relation to each other between a closed and an open position and defining a handle mould cavity corresponding to the shape of the handle and a bucket mould cavity corresponding to the shape of the bucket, the stationary mould half having a female mould part so as to form the outer surface of the bucket and the movable mould half having a male mould part so as to form the inner surface of the bucket, wherein the handle mould cavity in its entirety is radially external to the bucket mould cavity, mould portions forming the projections of the handle being in the same axial plane as mould portions forming the openings of the bucket, but axially displaced towards the movable mould half, said movable mould half comprising an ejection plate having ejection pins extending to the handle mould cavity, and that in the portion corresponding to each of the projections the handle mould cavity is externally defined by a movable mould member arranged on an arm connected to the ejection plate, a driving means being attached to the arm to drive the mould member with the handle inwardly so as to bring the projections of the handle into engagement with the openings of the bucket ears when the ejection movement of the ejection plate is completed.

2. A mould as claimed in claim 1, wherein the movable mould members each has a mould cavity forming portion releasably attaching the handle to the mould members when the said members are driven inwardly to engagement with the openings of the bucket ears.

3. A mould as claimed in claim 2, wherein the mould cavity forming portion comprises a recess forming a portion of a rib externally on the handle.

4. A mould as claimed in claim 2, wherein the movable mould member is fixedly secured to the arm which in turn is connected to the ejection plate such that at least the portion of the arm, on which the mould member is arranged, is driven inwardly.

5. A mould as claimed in claim 4, wherein the arm is pivotally connected with the ejection plate.

6. A mould as claimed in claim 4, wherein the driving means (44,46,47)] comprises a slide arranged radially displaceably in the movable mould half, said slide having an opening through which the arm extends, and said opening provided with guide surfaces radially on each side of the arm so as to ensure that the movable mould member is displaced substantially axis parallel to the guide pins during the ejection movement of the ejection plate.

7. A mould as claimed in claim 1, wherein the movable mould member or the arm on which this is arranged and the stationary mould half have abutment faces co-acting in radial direction and abutting each other in the closed position of the mould so as to prevent the injection pressure, to which the movable mould member is subjected, from being transferred to the driving means.

8. An injection mould for making a bucket with a handle being pivotally connected to the bucket at two diametrically opposed portions thereof, each end of the handle being provided with a radial projection facing inwards and having an enlarged head snap-engaging an opening in an ear formed on the exterior of the bucket in each of the said diametrically opposed portions, said injection mould comprising a stationary mould half and a movable mould half axially displaceable in relation to each other between a closed and an open position and defining a handle mould cavity corresponding to the shape of the handle and a bucket mould cavity corresponding to the shape of the bucket, the stationary mould half having a female mould part so as to form the outer surface of the bucket and the movable mould half having a male mould part so as to form the inner surface of the bucket, wherein the handle mould cavity in its entirety is radially external to the bucket mould cavity, mould portions forming the projections of the handle being in the same axial plane as mould portions forming the openings of the bucket, but axially displaced towards the movable mould half along the axis of the bucket, said movable mould half comprising an ejection plate having ejection pins extending to the handle mould cavity, and that in the corresponding to each of the projections the handle mould cavity is externally defined by a movable mould member arranged on an arm connected to the ejection plate, a driving means being attached to the arm to drive the mould member with the handle inwardly so as to bring the projections of the handle into engagement with the openings of the bucket ears when the ejection movement of the ejection plate is completed.

\* \* \* \* \*